US011907222B1

United States Patent
Kosuru et al.

(10) Patent No.: US 11,907,222 B1
(45) Date of Patent: Feb. 20, 2024

(54) DETECTING CHAINS OF FUNCTIONS THAT VIOLATE A CONSTRAINT

(71) Applicant: HEWLETT PACKARD ENTERPRISE DEVELOPMENT LP, Houston, TX (US)

(72) Inventors: Ramakumar V. Kosuru, Austin, TX (US); Clifford Earl Gray, San Jose, CA (US); Joseph Stanley Kosinski, Jr., San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/815,369

(22) Filed: Jul. 27, 2022

(51) Int. Cl.
 G06F 16/2453 (2019.01)

(52) U.S. Cl.
 CPC .............. G06F 16/24547 (2019.01)

(58) Field of Classification Search
 CPC ........... G06F 16/24547; G06F 11/0754; G06F 11/0757
 See application file for complete search history.

(56) References Cited

U.S. PATENT DOCUMENTS

| 8,856,151 B2 | 10/2014 | George |
| 10,515,075 B2 | 12/2019 | Ramachandra et al. |
| 11,243,820 B1 | 2/2022 | Luo et al. |
| 2003/0056199 A1* | 3/2003 | Li .................. G06F 11/323 714/E11.181 |
| 2012/0191732 A1 | 7/2012 | George |
| 2018/0329952 A1 | 11/2018 | Ramachandra et al. |
| 2022/0108007 A1* | 4/2022 | Zatutschne-Marom ............... G06F 21/52 |
| 2022/0114009 A1* | 4/2022 | Ismael ................ G06F 9/545 |

OTHER PUBLICATIONS

Weber, Michael, Viren Shah, and Chris Ren. "A case study in detecting software security vulnerabilities using constraint optimization." Proceedings First IEEE International Workshop on Source Code Analysis and Manipulation. IEEE, 2001. (Year: 2001).*
Zhang, Jiaxing, et al. "Optimizing Data Shuffling in Data-Parallel Computation by Understanding User-Defined Functions." NSDI. vol. 12. 2012. (Year: 2012).*
Oracle, "PL/SQL Package", Jun. 26, 2022, 3 pages.
Redis, "Introduction to Redis", Jun. 26, 2022, 2 pages.
Wikipedia, "Redis", available online at <https://en.wikipedia.org/w/index.php?title=Redis&oldid=1083588417>, Apr. 19, 2022, 7 pages.
Wikipedia, "User-defined function", available online at <https://en.wikipedia.org/w/index.php?title=User-defined_function&oldid=1041475611>, Aug. 30, 2021, 4 pages.

* cited by examiner

*Primary Examiner* — William Spieler
(74) *Attorney, Agent, or Firm* — Trop, Pruner & Hu, P.C.

(57) ABSTRACT

In some examples, a system determines whether a chain of functions violates a constraint, based on accessing a tracking structure populated with entries as the functions are invoked by respective server processes launched during execution of a database operation, where each entry of the entries of the tracking structure identifies a respective invoked function that is associated with a corresponding program instance, and detecting, using the tracking structure, related functions that form the chain, the related functions being identified as related if associated with a same program instance. In response to determining that the chain of the functions violates the constraint, the system blocks an invocation of a further function to be added to the chain.

17 Claims, 5 Drawing Sheets

DETECTING CHAINS OF FUNCTIONS THAT VIOLATE A CONSTRAINT

BACKGROUND

Database queries can be submitted to a database system to perform operations on relational tables of the database system. Examples of database queries include Structured Query Language (SQL) queries.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A database query submitted for processing by a database system can invoke various functions to perform respective specified tasks. In some examples, a function that can be triggered can include user defined function (UDF). A "UDF" can refer to a function developed by a user (or group of users), or another entity such as a program or machine, that is not part of a database programming language (e.g., a Structured Query Language (SQL)), but rather can be tailored to perform specific actions with respect to data.

In other examples, a function that can be triggered can include a native function of the database programming language (e.g., SQL). A native function can perform predefined tasks, such as a function to sum values, a function to calculate an average of values, and so forth.

A database query can invoke a first function (e.g., a first UDF), which in turn can invoke a second function (e.g., a second UDF), which in turn can invoke a third function (e.g., a third UDF), and so forth. The invocation of a function by another function is referred to as a nested invocation of the function. The length of nested invocations of functions can be arbitrarily long.

In some cases, a nested chain of functions can include a cycle of functions, in which the nested chain of functions starts at a first function and has another function that invokes the first function. A nested chain of functions that includes a cycle of functions is referred to as a cyclical chain of functions.

The presence of a lengthy nested chain of functions or a cyclical chain of functions can result in resource contention in a system in which the functions are executed. Examples of resources subject to contention by execution of a nested chain of function any or some combination of processing resources (e.g., a hardware processor, multiple hardware processors, a core of a multi-core processor, plural cores of a multi-core processor, etc.), storage resources (e.g., a memory, a disk-based storage, a solid-state drive, etc.) and/or a communication resource (a network interface controller, a switch or router, etc.). Additionally, resources can include virtual resources, such as virtual machines, containers, and so forth.

In addition, database operations performed in response to a database query can modify data in tables, which can include rows. As rows are modified (e.g., rows are inserted, rows are deleted, or rows are updated) in a table, locks can be placed on the rows that are being modified. A cyclical chain of functions that perform modifications of rows that result in locks being placed on the rows can produce deadlocks, in which locks placed on the table rows may prevent the functions in the cyclical chain of functions from progressing further.

In accordance with some implementations of the present disclosure, techniques or mechanisms are provided to detect the presence of lengthy nested chains of functions (a "lengthy" nested chain of functions is a chain that includes more than a specified number of functions) and/or a cyclical chain of functions. In response to detecting the lengthy chain of functions or a cyclical chain of functions, a system can prevent further addition of a function to be added to the chain.

A further issue related to a nested chain of functions is that data members associated with a package may not be shareable by the functions of the nested chain of functions. A "package" can be defined by package data that identifies data members that are part of the package, as well as UDFs in the package. The package data is in the form of a data structure having a specified format. A "data member" can refer to any variable or parameter. If the data members (or more specifically, the most updated values of the data members) of the package are not available to any UDF in the package, then the UDFs in a nested chain of UDFs may produce erroneous results, such as when computations are based on stale versions of the data members. In accordance with some implementations of the present disclosure, related functions of a package can share access of data members that are part of the package. In some examples, the data members of the package can be stored in a cache for sharing by the related functions.

Figure 1:
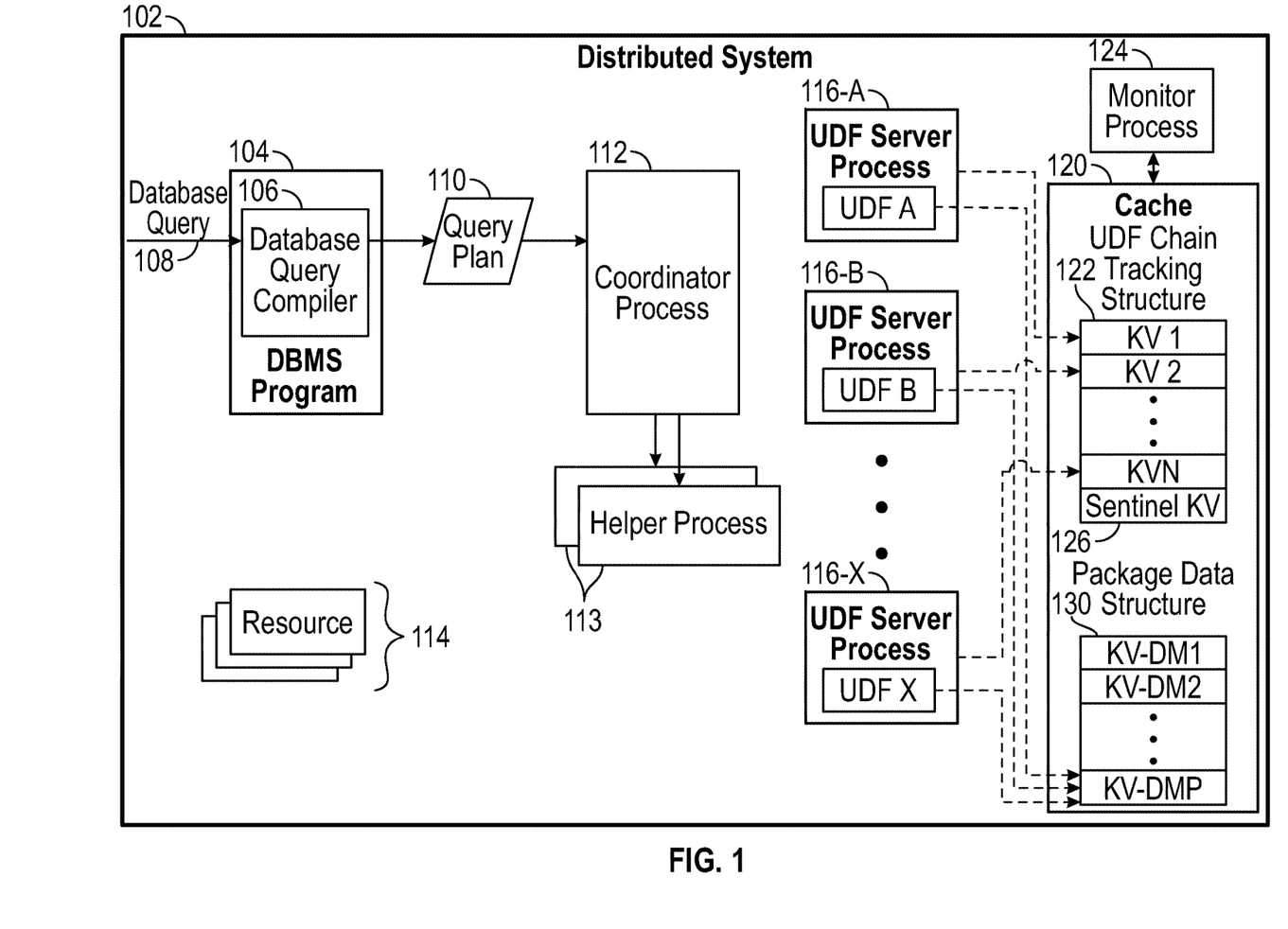
FIG. 1 is a block diagram of a distributed system including a database management program, user defined function (UDF) server processes to execute respective UDFs, and a monitor process according to some examples.

FIG. 1 is a block diagram of a distributed system 102 in which database operations can be performed. A "distributed system" refers to a system that has multiple computing nodes, where each "computing node" can refer to a computer, a processor, a core of a multi-core processor, or any other type of processing circuit. The distributed system 102 is a distributed database system that is able to access data in response to database queries.

The distributed system 102 includes a database management system (DBMS) program 104 that can process database queries, such as SQL queries. SQL refers to a database programming language that allows for management of data held in a relational database management system (RDBMS). In other examples, database queries according to other languages can be employed.

The DBMS program 104 includes a database query compiler 106 that can parse a database query 108 into a query plan 110. For example, the database query can include a SQL statement, which can be individually submitted by a requester or can be part of a package of SQL statements. The query plan 110 produced by the database query compiler 106 can include a set of instructions that describe the various tasks performed for a database operation invoked by the database query 108.

In some examples, a coordinator process 112 can be initiated in the distributed system 102 for executing database operations according to the query plan 110. For example, the coordinator process 112 can be used to coordinate the usage of resources of the distributed system 102. The resources can include processing resources, storage resources, and/or communication resources. The coordinator process 112 can launch various helper processes 113 to perform specific tasks associated with the database operations for the query plan 110.

A "helper process" can refer to a process in the distributed system 102 that performs tasks delegated to the helper process by the coordinator process 112. The multiple helper processes 113 can execute in parallel, such as on respective different processors or processor cores. In other examples, helper processes are not used by the coordinator process 112.

In some examples, functions can be triggered as part of the query plan 110 to perform respective actions. In some examples, the functions that are triggered can include UDFs or native functions.

Functions, including UDFs and/or native functions, can perform any of various different types of actions on data, such as to compute a mathematical computation of data values, generate an output value based on various input data values, determine whether data values satisfy a criterion, and so forth.

Figure 2:
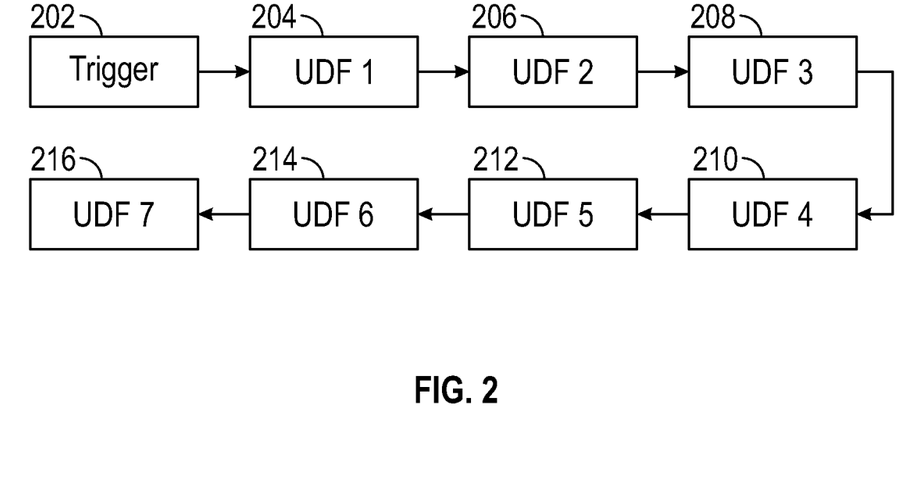
FIG. 2 illustrates a nested chain of UDFs that violates a length constraint, according to some examples.

In some cases, there can be nested invocations of functions. For example, a first UDF may be invoked by a trigger that is part of a database query, the first UDF can invoke a second UDF, the second UDF can invoke a third UDF, and so forth. FIG. 2 shows an example in which 7 UDFs are invoked, one following another, in a nested chain of UDFs. In the example of FIG. 2, a trigger 202 in a database query invokes a first UDF 204, which invokes a second UDF 206, which invokes a third UDF 208, which invokes fourth UDF 210, which invokes a fifth UDF 212, which invokes a sixth UDF 214, and which invokes seventh UDF 216. The length of nested invocations of the UDFs can be arbitrarily long. In the example of FIG. 2, the length of the nested chain of UDFs is 7 (7 UDFs invoked).

A "trigger" in a database query can refer to any part of the database query (such as a clause, a predicate, etc.) that makes a call of a function, such as a UDF or a native function.

Figure 3:
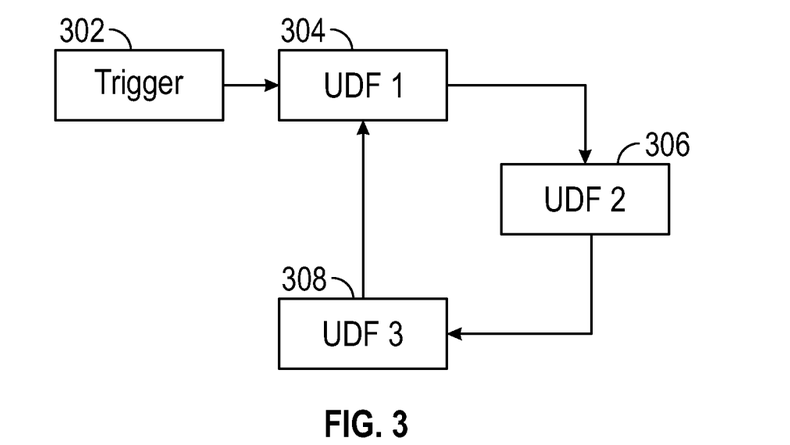
FIG. 3 illustrates a cyclical chain of UDFs according to some examples.

FIG. 3, shows an example of a cyclical chain of UDFs. In the example of FIG. 3, a trigger 302 invokes a first UDF 304, which invokes a second UDF 306, which invokes a third UDF 308, and which invokes the first UDF 304. Since the third UDF 308 invokes the first UDF 304, a cycle of UDFs is formed in the nested chain of UDFs shown in FIG. 3.

The presence of a lengthy nested chain of functions (a chain of functions with a length that exceeds a length threshold) or a cyclical chain of functions can result in resource contention in the distributed system 102. In some examples, a UDF server process is launched to execute a respective UDF. For example, FIG. 1 shows a UDF server process 116-A to execute UDF A, a UDF server process 116-B to execute UDF B, . . . , and a UDF server process 116-X to execute UDF X. The multiple UDF server processes 116-A to 116-X can compete for resources 114 of the distributed system 102. The resources 114 can include any or some combination of processing resources, storage resources, communication resources, virtual resources, and so forth.

Each UDF server process 116-A, 116-B, . . . , 116-X defines an isolated computing environment in which a respective UDF is executed. Thus, for example, UDF A executed in the UDF server process 116-A is isolated from the execution of UDF B in the UDF server process 116-B. Each UDF server process can be implemented as a Java virtual machine (JVM), a container, or any other virtual environment. Each call of a given UDF (whether called by a trigger in a database query or another UDF) results in another invocation of the given UDF by the corresponding UDF server process.

Resource contention among the UDF server processes 116-A to 116-X can result in inefficient execution of database operations that involve execution of the respective UDFs A to X. For example, if a resource requested by a first UDF server process is unavailable or is being heavily utilized due to execution of a second UDF server process, then the first UDF server process may not be able to execute its respective UDF in a timely fashion.

In accordance with some implementations of the present disclosure, to support detection of lengthy nested chains of UDFs or cyclical chains of UDFs, a UDF chain tracking structure 122 may be stored in a cache 120. A "cache" can be implemented using a collection of memory devices (a single memory device or multiple memory devices). In some examples, the cache 120 may include a Remote Dictionary Server (Redis), which is according to an open-source protocol that provides an in-memory data structure store of in-memory key-value pairs. In other examples, the cache 120 can store data according to other formats or protocols.

The UDF chain tracking structure 122 includes entries that each identifies a respective UDF of a nested chain of UDFs. The UDF chain tracking structure 122 is associated with a corresponding program instance, which is an instance of a program such as an application program, a utility program, or another type of program. If the distributed system 102 is executing database operations for multiple program instances (which can be different instances of the same program or instances of different programs), then the cache 120 can store multiple UDF chain tracking structures associated with respective different program instances. In other examples, one UDF chain tracking structure 122 can be used to store entries for multiple program instances.

The entries of the UDF chain tracking structure 122 are populated as UDFs are invoked and their respective UDF server processes (e.g., 116-A to 116-X) are launched during execution of database operations. The UDF chain tracking structure 122 contains information of related UDFs, where UDFs are related if they are associated with (e.g., invoked in response to) the same program instance.

In some examples, a monitor process 124 (including machine-readable instructions) is able to monitor the UDF chain tracking structure 122 to determine whether a nested chain of UDFs violates a constraint.

In some examples, the monitor process 124 is separate from the UDF server processes 116-A to 116-X, the coordinator process 112, and the helper processes 113. In other examples, the monitor process 124 (or multiple instances of the monitor process 124) can be part of any one or more of the UDF server processes 116-A to 116-X, and/or the coordinator process 112, and/or any one or more of the helper processes 113.

A nested chain of UDFs would violate the constraint if either or both of the following is present: (1) a length of the nested chain of UDFs exceeds a specified length (where a "length" of a nested chain of functions is equal to how many functions are in the nested chain of functions), or (2) the nested chain of UDFs (or more generally, a nested chain of functions) is cyclical.

In the above, the constraint includes a length constraint and a cyclical constraint. As used here, the term "constraint" can refer to a single constraint or multiple constraints.

Detecting Violations of Constraints by Nested Chains of UDFs

Figure 4:
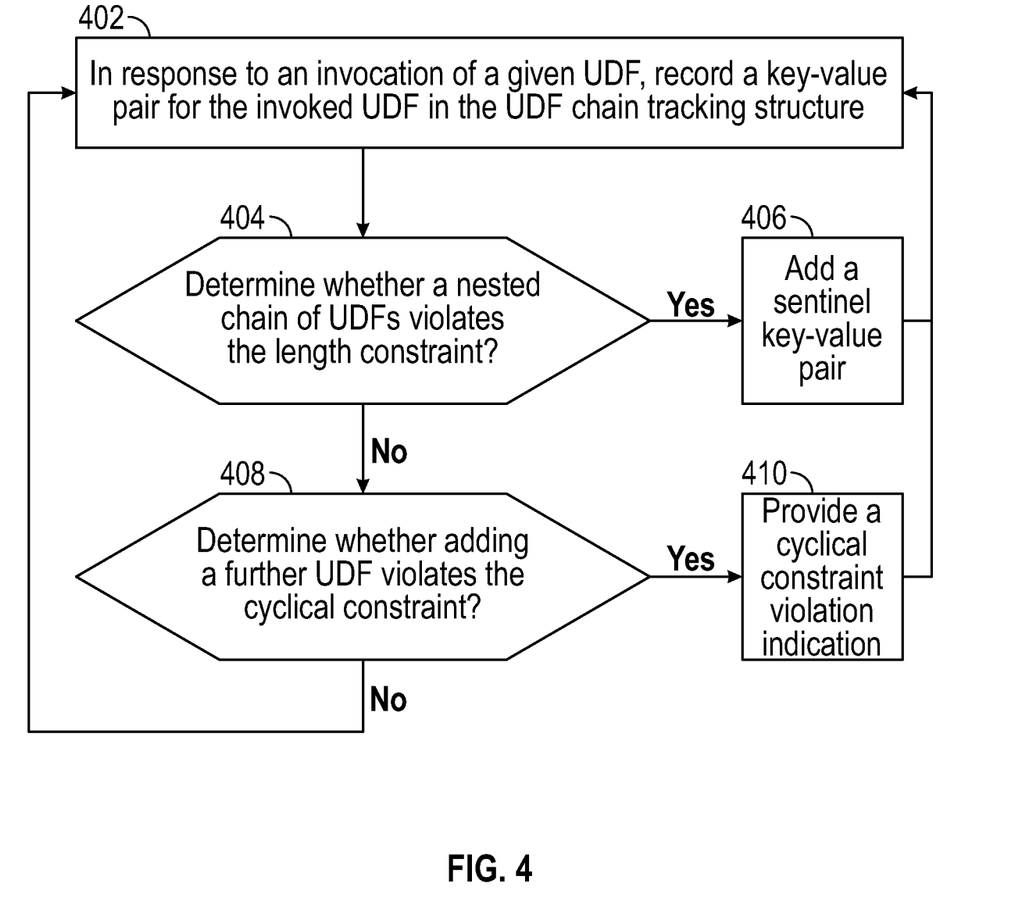
FIG. 4 is a flow diagram of a process of detecting violation of a constraint, according to some examples.

Referring to FIGS. 1 and 4, a process performed by components of the distributed system 102 is depicted.

In response to an invocation of a given UDF ("UDF k" where k is one of A, B, . . . , X) by a UDF server process (one of 116-A to 116-X), the UDF server process can record (at 402) a key-value pair for the invoked UDF k in the UDF chain tracking structure 122. The UDF server process can invoke UDF k in response to a call by a database query or a call in another UDF.

The UDF chain tracking structure 122 has multiple entries that contain corresponding key-value pairs, such as KV1, KV2, . . . , KVN (N≥2) depicted in FIG. 1. Although FIG. 1 shows the entries of the UDF chain tracking structure 122 containing respective key-value pairs, in other examples, the entries of the UDF chain tracking structure 122 can contain data relating to UDFs in a different form.

A key-value pair in an entry of the UDF chain tracking structure 122 contains a key and an associated value. The key contains a program instance value that identifies a program instance that the invocation of the UDF is associated with. The program instance value may be in the form of a process ID. As an example, a program P may issue a database query that triggers invocation of a first UDF, which in turn invokes a second UDF, which in turn invokes a third UDF, and so forth, in a nested chain of UDFs. UDF k in the above example can be one of the UDFs in the nested chain of UDFs.

The key may also contain a UDF identification value to identify UDF k-1 that invoked UDF k. The value of the key-value pair is a UDF identification value to identify UDF k that is invoked.

As an example, the key-value pair added to the UDF chain tracking structure 122 in response to the invocation of UDF k can be in the following form:

{Key=100INT(k-1), Value=INT(k)}.

In the above example key-value pair, INT(k) is the UDF identification value of UDF k that is invoked, 100 is the process ID of the program instance, and INT(k-1) is the UDF identification value of UDF k-1 that invoked UDF k. In some examples, the process ID (such as 100) can be a random number or any other value that can uniquely identify a program instance. A UDF identification value can also be a random number or any other value that can uniquely identify a UDF.

Note that if UDF k was called by a trigger in a database query rather than another UDF, then the key of the key-value pair added for the invocation of UDF k can include some predefined value indicating that the calling entity is a trigger rather than another UDF.

As UDFs are invoked by respective UDF server processes that are associated with the program instance having the process ID 100, corresponding key-value pairs are added to entries of the UDF chain tracking structure 122 where each key of the key-value pairs contains the process ID 100.

The monitor process 124 can determine (at 404) whether a nested chain of UDFs violates the length constraint. In some examples, the monitor process 124 can analyze the key-value pairs in the entries of the UDF chain tracking structure 122 on a periodic basis (e.g., once every specified time interval) or in response to another event (e.g., a detection that resource usage is high, a detection of a slowdown in database operations of the distributed system 102, etc.). In such examples, the monitor process 124 determines whether the nested chain of UDFs represented by the collection of key-value pairs in the entries of the UDF chain tracking structure 122 violates the length constraint.

The monitor process 124 can determine whether a length of the nested chain of UDFs represented by the collection of key-value pairs violates the length constraint (i.e., the length is at or is greater than a length threshold). The monitor process 124 can retrieve entries from the UDF chain tracking structure 122 that contain keys with a common process ID (for identifying a given program instance). From the key-value pairs in the retrieved entries, the monitor process 124 can determine a length of the nested chain of UDFs, which is determined from the key-value pairs by identifying which UDFs invoke other UDFs. An example collection of key-value pairs retrieved from the UDF chain tracking structure 122 is provided below:

{Key=100INT(1), Value=INT(2)},
{Key=100INT(2), Value=INT(3)},
{Key=100INT(3), Value=INT(4)},
{Key=100INT(4), Value=INT(5)}
{Key=100INT(5), Value=INT(6)}
{Key=100INT(6), Value=INT(7)}.

The above collection of key-value pairs indicates that a UDF having a UDF identification value INT(1) invoked a UDF having a UDF identification value INT(2), the UDF identification value INT(2) invoked a UDF having a UDF identification value INT(3), and so forth.

Based on the key-value pairs in the entries of the UDF chain tracking structure 122, that the monitor process 124 can determine that the length of the UDF chain (from INT(1) to INT(7)) is 7. If the length threshold is 6 (for example), then the monitor process 124 can detect that the nested chain of UDFs in the above example is at the length threshold, and thus, the nested chain of UDFs violates the length constraint.

Note that even if the length threshold is 7 in the above example, the monitor process 124 would still determine that the nested chain of UDFs with a length of 7 violates the length constraint, since adding a further UDF to the nested chain of UDFs would cause the length threshold to be exceeded.

In response to determining that the nested chain of UDFs violates the length constraint, the monitor process 124 adds (at 406) a "sentinel" key-value pair 126 to an entry of the UDF chain tracking structure 122. The sentinel key-value pair 126 provides a violation indication that indicates that the nested chain of UDFs violates the constraint. The key of the sentinel key-value pair 126 includes a program instance value (e.g., 100 in the above example), and the value the sentinel key-value pair 126 includes a specified value (e.g., some predefined number or character string) that indicates that the nested chain of UDFs violates the constraint.

In some examples, before invoking a new UDF, a UDF server process can check for the sentinel key-value pair 126 by reading the UDF chain tracking structure 122. The UDF server process can search the UDF chain tracking structure 122 for presence of the sentinel key-value pair 126, such as by searching for the specified value or searching for a flag or other special header indicating an entry as containing a sentinel key-value pair.

If the UDF server process determines that the sentinel key-value pair 126 is present, then the UDF server process can block invocation of another UDF associated with the same program instance (e.g., the program instance having the process ID 100).

Although FIG. 1 shows the UDF chain tracking structure 122 with one sentinel key-value pair 126, in other examples, the monitor process 124 may have added multiple sentinel key-value pairs to the UDF chain tracking structure 122 to indicate respective nested chains of UDFs that have violated the constraint.

The foregoing refers to an example where the monitor process 124 analyzes the entries of the UDF chain tracking structure 122 on a periodic basis or in response to another event. In some cases, it may be possible that by the time the monitor process 124 analyzes the entries of the UDF chain tracking structure 122, the length of the nested chain of UDFs may already be greater than the length threshold.

In other examples, the monitor process 124 can determine (at 404) whether the nested chain of UDFs violates the length constraint in response to a request to invoke a further UDF for the program instance (e.g., the one having process ID 100). In such examples, the monitor process 124 can be part of a UDF server process, and the monitor process 124 in the UDF server process can, in response to the request to invoke the further UDF (and prior to invoking the further UDF), check the entries of the UDF chain tracking structure 122 to determine whether adding the further UDF to the nested chain of UDFs would violate the length constraint. If not, the UDF server process can allow the further UDF to be invoked. However, if adding the further UDF to the nested chain of UDFs would violate the length constraint, then the UDF server process would block invocation of the further UDF. In addition, if adding the further UDF to the nested chain of UDFs would violate the length constraint, the monitor process 124 adds (at 406) the sentinel key-value pair 126 to the UDF chain tracking structure 122.

Similarly, the monitor process 124 in a UDF server process can prevent a cyclical chain of UDFs from occurring. The monitor process 124 determines (at 408) whether adding a further UDF in response to a request to invoke the UDF violates the cyclical constraint. To do so, the monitor process 124 retrieves the key-value pairs from the UDF chain tracking structure 122 and determines the existing nested chain of UDFs.

Another example collection of key-value pairs retrieved from the UDF chain tracking structure 122 is provided below:

{Key=100INT(1), Value=INT(2)},
{Key=100INT(2), Value=INT(3)},

The existing nested chain of UDFs in this example is INT(1)→INT(2)→INT(3).

The further UDF may have a UDF identification value INT(1), and may be invoked by the UDF with UDF identification value INT(3). Adding this further UDF to the nested chain of UDFs would result in a cycle of UDFs, since the UDF chain would start at INT(1) and end at INT(1), which violates the cyclical constraint.

If the addition of the further UDF to the existing nested chain of UDFs would result in a cycle, then the monitor process 124 provides (at 410) a cyclical constraint violation indication, which causes the UDF server process to block invocation of the further UDF. A cyclical invocation of UDFs can be detected by the UDF server process before it occurs since the UDF server process knows the UDF identification value of the UDF about to be invoked, and based on the reconstructed existing nested chain of UDFs the UDF server process can detect the cycle.

If neither the length constraint nor the cyclical constraint is violated, then invocation of a further UDF is allowed.

Shared Access of Package Data Members

In accordance with some implementations of the present disclosure, the UDFs of a nested chain of UDFs associated with the same program instance can share access of data members of a package that also identifies related UDFs that are part of the package. A data member of the package that is modified by any UDF of the package can be visible to other UDF(s) of the package.

FIG. 1 shows a package data structure 130 that is stored in the cache 120. In some examples, the package data structure 130 includes entries that have key-value pairs corresponding to the data members of the package. The data members include data members DM1, DM2, . . . , DMP (P≥2). More generally, a package can include just a single data member or multiple data members.

Each key-value pair of the package data structure 130 includes a key that includes the name of the data member, and a value that is a current value of the data member identified by the key. The key can also include an identifier of the package. Thus, in an example, the key of each key-value pair in the package data structure 130 includes an identifier of the package and the name of the corresponding data member. In the package data structure 130, KV-DM1 is the key-value pair for data member DM1, KV-DM2 is the key-value pair for data member DM2, and KV-DMP is the key-value pair for data member DMP.

In an example, UDF A executed by the UDF server process 116-A can modify the value of data member DMP in the package data structure 130, and this modified value is accessible to UDF B and UDF X as soon as the value of data member DMP is modified by UDF A.

The UDF server processes executing respective UDFs may run on different computing nodes of the distributed system 102. The cache 120 is a distributed cache that is accessible by the UDF server processes from across the different computing nodes.

When a new UDF of the package is invoked that leads to a creation of a new UDF server process, the associated data members DM1 to DMP of the package is made accessible to the new UDF.

If a package does not include a large quantity of data members (e.g., the quantity of data members is less than a quantity threshold, such as less than 50, or less than 40, or less than 30, or less than 20, or less than 10, or less than 5, etc.), then the package data structure 130 can include as many key-value pairs as there are data members. When a data member is modified, the corresponding key-value pair is modified correspondingly so that all of the related UDFs of the package are able to see the latest data member value.

In some cases, a data member is updated just once, and becomes read-only after the one update. In this case, the key-value pair for the data member remains unchanged and can be looked up using the key of the key-value pair.

In other examples, the package may include a large quantity of data members (e.g., the quantity of data members is greater than a quantity threshold, such as greater than 100, or greater than 50, or greater than 40, or greater than 30, or greater than 20, or greater than 10, or greater than 5, etc.). In such examples, the data members can be serialized into a data representation that allows the data members to be retrieved in a more efficient manner than individually storing separate key-value pairs in individual entries of the package data structure 130.

For example, the data members can be serialized into an array of data members, into a tree of data members, and so forth. The array of data members or the tree of data members is an example of the package data structure 130. Different entries of the array of data members may be indicated by different offsets into the array. In such examples, each entry of the array includes the value of a respective data member. The "key" to access the entry can be an offset of the entry. In further examples, if the package data structure 130 includes a tree of data members, then the nodes of the tree contain the values of corresponding data members, and the "keys" are indexes to the nodes.

In other examples, a data member can include a large object. A large object can have a size that is greater than a size threshold, e.g., greater than 1 megabyte (MB), or greater than 5 MBs, or greater than 10 MBs, or greater than 50 MBs, or greater than 100 MBs, etc. A UDF updating a large object may update just a small portion (e.g., a small number of bytes) of the large object. The UDF can send just the small updated portion to the cache 120 to update the corresponding part of the package data structure 130 in the cache 120. In this way, the large object can be efficiently updated in-place in the cache 120, such that the UDF updating the large object does not have to send the entire updated large object to the package data structure 130 in the cache 120.

Further Examples

Figure 5:
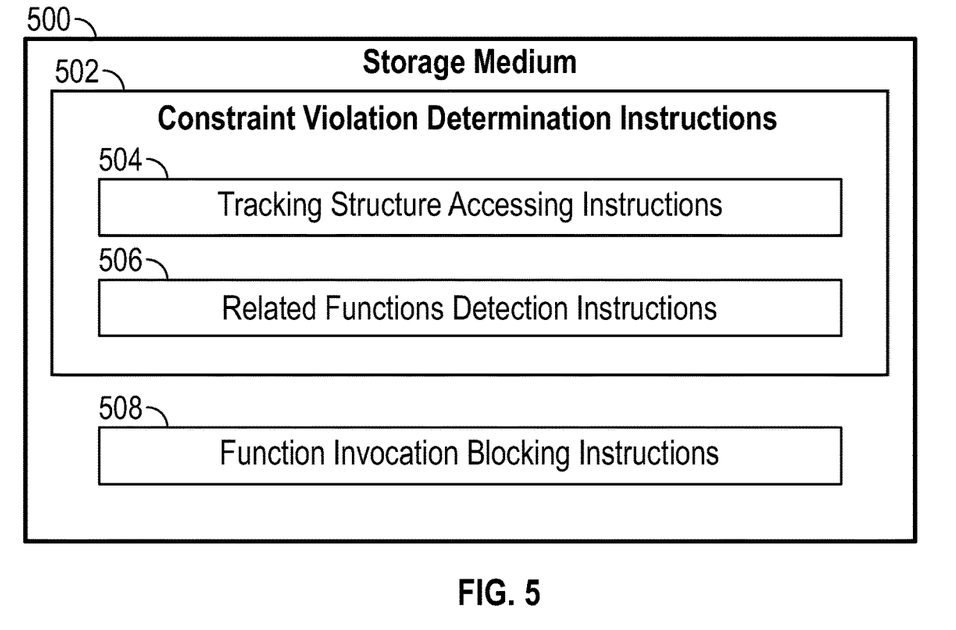
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system (e.g., the distributed system 102 of FIG. 1) to perform various tasks.

The machine-readable instructions include constraint violation determination instructions 502 to determine whether a chain of functions violates a constraint, including a length constraint and/or a cyclical constraint.

The constraint violation determination instructions 502 include tracking structure accessing instructions 504 to access a tracking structure populated with entries as the functions are invoked by respective server processes launched during execution of a database operation. Each entry of the entries of the tracking structure identifies a respective invoked function that is associated with a corresponding program instance. An example of the tracking structure is the UDF chain tracking structure 122 of FIG. 1. The functions can be UDFs and/or native functions.

The constraint violation determination instructions 502 include related functions detection instructions 506 to detect, using the tracking structure, related functions that form the chain of functions, the related functions being identified as related if associated with a same program instance.

The machine-readable instructions include further function invocation blocking instructions 508 to, in response to determining that the chain of the functions violates the constraint, block an invocation of a further function to be added to the chain. For example, the constraint can be a length constraint and/or a cyclical constraint. The further function invocation blocking instructions 508 can block the invocation of the further function if the chain including the related functions indicated by the tracking structure is at or exceeds a length threshold. The further function invocation blocking instructions 508 can block the invocation of the further function if adding the further function would cause the chain of functions to exceed the length threshold. The further function invocation blocking instructions 508 can block the invocation of the further function if adding the further function would result in a cycle of functions in the chain of functions.

In some examples, each entry of the entries of the tracking structure includes a program instance value (e.g., process ID) that identifies the corresponding program instance, where the related functions are identified as being related using the program instance values in the tracking structure.

In some examples, different program instance values in the tracking structure identify different program instances for which functions are invoked.

In some examples, in response to determining that the length of the related functions that form the chain is at or is greater than the length threshold, a violation indicating entry (e.g., the sentinel key-value pair 126 of FIG. 1) is added to the tracking structure.

In some examples, the related functions are part of a package that further includes data members accessible by the related functions.

In some examples, the machine-readable instructions store the data members in a package data structure in a cache to share the data members among the related functions executed in corresponding server processes.

In some examples, the data members are stored as key-value pairs in the package data structure, each key-value pair of the key-value pairs in the package data structure including a key containing an identifier of the package, and a value representing a respective data member of the data members.

In some examples, the key-value pairs in the package data structure are arranged as a tree of nodes in the cache, and each node of the tree is identified by an index and represents a corresponding data member value.

In some examples, the key-value pairs in the package data structure are arranged as an array in the cache, and each entry of the array is identified by an offset and represents a corresponding data member value.

Figure 6:
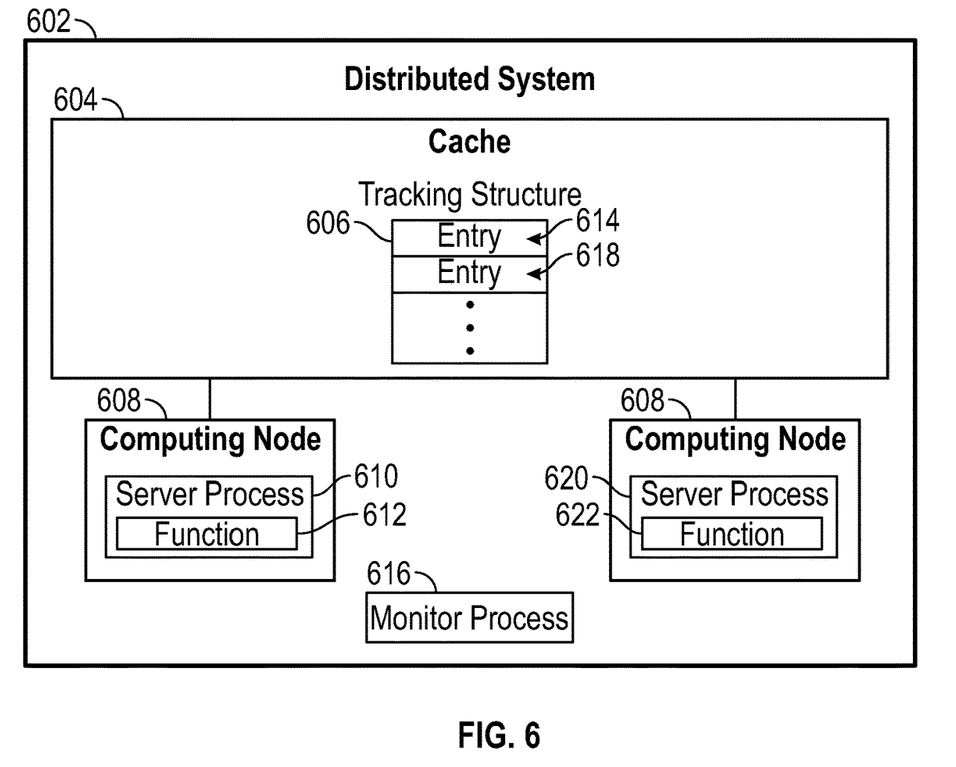
FIG. 6 is a block diagram of a distributed system according to some examples.

FIG. 6 is a block diagram of a distributed system 602 according to further examples. The distributed system 602 includes a cache 604 to store a tracking structure 606. An example of the tracking structure 606 is the UDF chain tracking structure 122 of FIG. 1.

The distributed system 602 includes a plurality of computing nodes 608 to execute respective server processes 610, 620 that invoke respective functions 612, 622 for a database operation. Examples of the server processes 610 include the UDF server processes 116-A to 116-X of FIG. 1. The functions 612 can be UDFs and/or native functions.

In response to a first server process 610 invoking a first function 612, the first server process 610 adds a first entry 614 to the tracking structure 606 in the cache 604. The first entry 614 identifies a program instance the first function 612 is associated with, and includes an identifier of the first function 612.

The distributed system 602 includes a monitor process 616 to analyze entries of the tracking structure 606 to determine whether a chain of functions invoked for the program instance violates a constraint. The entries include the first entry 614 and a second entry 618 identifying the program instance a second function 622 is associated with, and includes an identifier of the second function 622.

Figure 7:
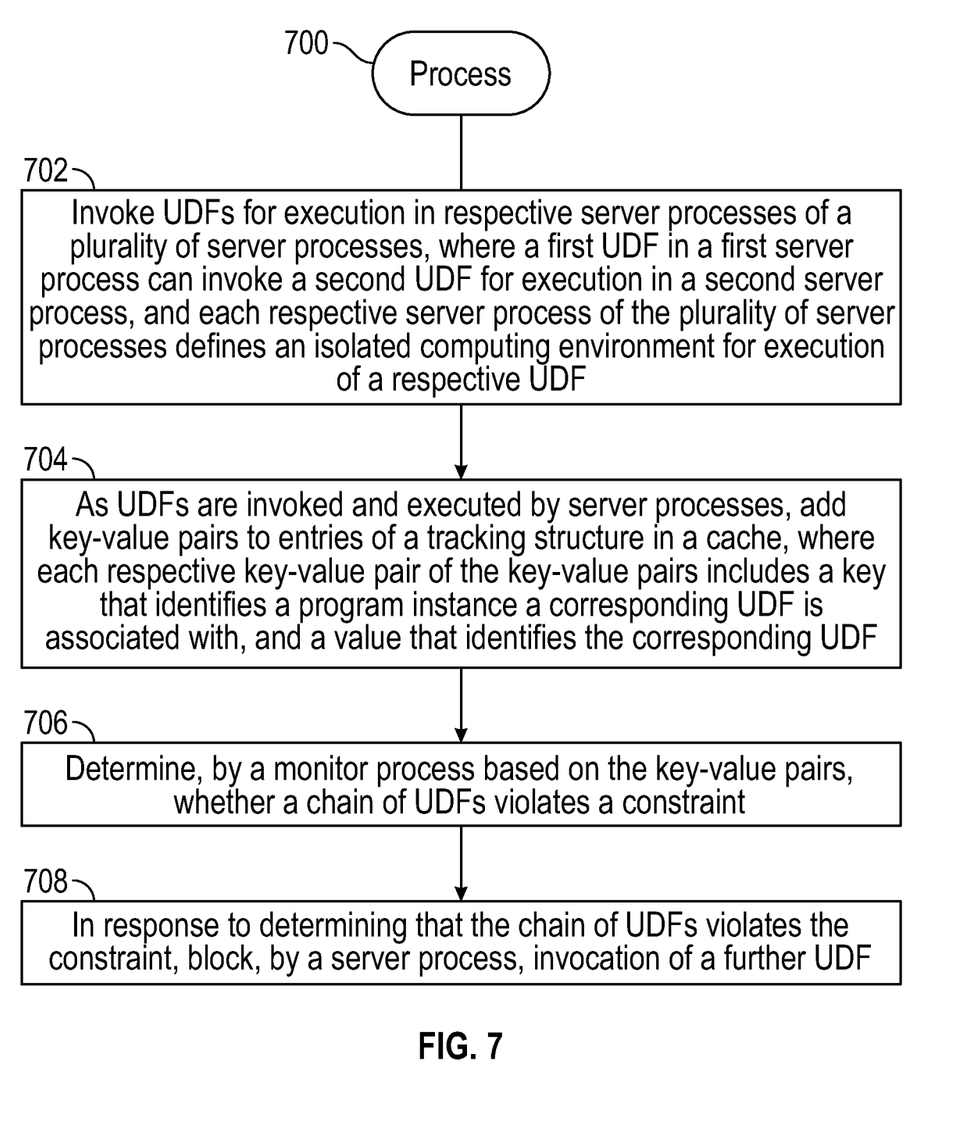
FIG. 7 is a flow diagram of a process according to further examples.

FIG. 7 is a flow diagram of a process 700 according to some examples, which may be performed by a distributed system (e.g., 102 in FIG. 1 or 602 in FIG. 6).

The process 700 includes invoking (at 702) UDFs for execution in respective server processes of a plurality of server processes (e.g., UDF server processes 116-A to 116-X in FIG. 1). A first UDF in a first server process can invoke a second UDF for execution in a second server process. Each respective server process of the plurality of server processes defines an isolated computing environment for execution of a respective UDF.

The process 700 further includes, as UDFs are invoked and executed by server processes, adding (at 704) key-value pairs to entries of a tracking structure (e.g., UDF chain tracking structure 122 of FIG. 1) in a cache (e.g., 120 in FIG. 1), where each respective key-value pair of the key-value pairs includes a key that identifies a program instance a corresponding UDF is associated with, and a value that identifies the corresponding UDF. The key can include a process ID of the program instance, and an identifier of the UDF. The adding of the key-value pairs to the tracking structure includes a first server process adding a first key-value pair to a first entry of the tracking structure in response to invocation of a first UDF, and a second server process adding a second key-value pair to a second entry of the tracking structure in response to invocation of a second UDF.

The process 700 includes determining (at 706), by a monitor process (e.g., 124 in FIG. 1) based on the key-value pairs, whether a chain of UDFs violates a constraint. In some examples, the constraint is a length constraint, and the chain of UDFs violates the length constraint if the length of the chain of UDFs is at or exceeds a length threshold. In other examples, the constraint is a cyclical constraint, and the chain of UDFs violates the cyclical constraint if a cycle of UDFs is present in the chain.

The process 700 includes, in response to determining that the chain of UDFs violates the constraint, blocking (at 708), by a server process, invocation of a further UDF. The server process that blocks invocation of the further UDF can be a server process launched to execute the further UDF in response to a request to invoke the further UDF during a database operation.

A storage medium (e.g., 500 in FIG. 5) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   determine whether a chain of functions violates a constraint, based on:
      accessing a tracking structure populated with entries as the functions are invoked by respective server processes launched during execution of a database operation, wherein each entry of the entries of the tracking structure identifies a respective invoked function that is associated with a corresponding program instance, and
      detecting, using the tracking structure, related functions that form the chain, the related functions being identified as related if associated with a same program instance; and
   in response to determining that the chain of the functions violates the constraint, block an invocation of a further function to be added to the chain.

2. The non-transitory machine-readable storage medium of claim 1, wherein each entry of the entries of the tracking structure comprises a program instance value that identifies the corresponding program instance, and wherein the related functions are identified as being related using the program instance values in the tracking structure.

3. The non-transitory machine-readable storage medium of claim 2, wherein different program instance values in the tracking structure identify different program instances for which functions are invoked.

4. The non-transitory machine-readable storage medium of claim 1, wherein the functions are user-defined functions (UDFs) invoked in processing a database query that triggered the database operation.

5. The non-transitory machine-readable storage medium of claim 1, wherein each server process of the server processes is to execute a respective function of the functions in a separate computing environment.

6. The non-transitory machine-readable storage medium of claim 1, wherein the instructions upon execution cause the system to:
   determine that the chain of the functions violates the constraint in response to determining that a length of the related functions that form the chain is at or is greater than a length threshold; and
   in response to determining that the length of the related functions that form the chain is at or is greater than the length threshold, add a violation indicating entry to the tracking structure.

7. The non-transitory machine-readable storage medium of claim 1, wherein the instructions upon execution cause the system to:
   determine that the chain of the functions violates the constraint in response to determining that adding the further function to the related functions in the chain would form a cycle of functions in the chain.

8. The non-transitory machine-readable storage medium of claim 1, wherein each entry of the entries of the tracking structure comprises a key-value pair including a key that identifies an entity that invoked the respective invoked function, and a value that identifies the respective invoked function.

9. The non-transitory machine-readable storage medium of claim 8, wherein the key further comprises an identifier of the corresponding program instance.

10. The non-transitory machine-readable storage medium of claim 8, wherein the entity that invoked the respective invoked function comprises a trigger in a database query or another function.

11. The non-transitory machine-readable storage medium of claim 1, wherein the related functions are part of a package that further includes data members accessible by the related functions.

12. The non-transitory machine-readable storage medium of claim 11, wherein the instructions upon execution cause the system to:
store the data members in a package data structure in a cache to share the data members among the related functions executed in corresponding server processes.

13. The non-transitory machine-readable storage medium of claim 12, wherein the data members are stored as key-value pairs in the package data structure, each key-value pair of the key-value pairs in the package data structure comprising a key containing an identifier of the package, and a value representing a respective data member of the data members.

14. The non-transitory machine-readable storage medium of claim 13, wherein the key-value pairs in the package data structure are arranged as a tree of nodes in the cache, and each node of the tree is identified by an index and represents a corresponding data member value.

15. The non-transitory machine-readable storage medium of claim 13, wherein the key-value pairs in the package data structure are arranged as an array in the cache, and each entry of the array is identified by an offset and represents a corresponding data member value.

16. A method of a distributed system comprising a plurality of computing nodes and a plurality of server processes executed by the plurality of computing nodes, the method comprising:
invoking user-defined functions (UDFs) for execution in respective server processes of the plurality of server processes, wherein a first UDF in a first server process invokes a second UDF for execution in a second server process, wherein each respective server process of the plurality of server processes comprises a virtual environment that defines an isolated computing environment for execution of a respective UDF, and wherein a UDF comprises a function developed by an entity and is not part of a database programming language;
as the UDFs are invoked and executed by the respective server processes, adding key-value pairs to entries of a tracking structure in a cache, wherein each respective key-value pair of the key-value pairs comprises a key that identifies a program instance a corresponding UDF is associated with, and a value that identifies the corresponding UDF, wherein the adding comprises a first server process adding a first key-value pair to a first entry of the tracking structure in response to invocation of a first UDF, and a second server process adding a second key-value pair to a second entry of the tracking structure in response to invocation of a second UDF;
determining, by a monitor process based on the key-value pairs in the tracking structure, whether a chain of UDFs violates a constraint, wherein the monitor process comprises machine-readable instructions to monitor the tracking structure; and
in response to determining that the chain of UDFs violates the constraint, blocking, by a server process, invocation of a further UDF.

17. The method of claim 16, wherein the key of the respective key-value pair further identifies a trigger or another UDF that invoked the corresponding UDF.

* * * * *